US006959929B2

(12) United States Patent
Pugnet et al.

(10) Patent No.: US 6,959,929 B2
(45) Date of Patent: Nov. 1, 2005

(54) SEAL FOR A COMPRESSOR AND CENTRIFUGAL COMPRESSOR EQUIPPED WITH SUCH A SEAL

(75) Inventors: Jean-Marc Pugnet, Le Creusot (FR); Daniel Bolusset, Le Creusot (FR); Patrick Friez, Le Creusot (FR)

(73) Assignee: Thermodyn, Courbevoie (FR)

(*) Notice: Subject to any disclaimer, the term of this patent is extended or adjusted under 35 U.S.C. 154(b) by 0 days.

(21) Appl. No.: 10/205,425

(22) Filed: Jul. 26, 2002

(65) Prior Publication Data

US 2003/0030221 A1 Feb. 13, 2003

(30) Foreign Application Priority Data

Jul. 26, 2001 (FR) .................................. 01 10011

(51) Int. Cl.[7] ................................................ F16J 15/34
(52) U.S. Cl. ...................... 277/408; 277/359; 277/360; 277/361; 277/401
(58) Field of Search ................................ 277/358–408, 277/930

(56) References Cited

U.S. PATENT DOCUMENTS

| | | | | |
|---|---|---|---|---|
| 3,556,538 | A * | 1/1971 | Heinz | 277/579 |
| 3,804,424 | A * | 4/1974 | Gardner | 277/360 |
| 3,811,687 | A * | 5/1974 | Honold et al. | 277/387 |
| 3,926,442 | A * | 12/1975 | Muller | 277/348 |
| 4,196,911 | A * | 4/1980 | Matsushita | 277/401 |
| 4,613,141 | A * | 9/1986 | Heinen | 277/359 |
| 4,872,689 | A * | 10/1989 | Drumm | 277/408 |
| 5,137,116 | A * | 8/1992 | Von Bergen et al. | 184/6.22 |
| 5,156,523 | A * | 10/1992 | Maier | 415/175 |
| 5,217,233 | A * | 6/1993 | Pecht et al. | 277/306 |
| 5,421,593 | A * | 6/1995 | Aritsubo et al. | 277/361 |
| 5,718,560 | A * | 2/1998 | Lorenzen | 415/47 |
| 6,565,095 | B2 * | 5/2003 | Meacham | 277/408 |

FOREIGN PATENT DOCUMENTS

| | | |
|---|---|---|
| EP | 0 654 607 | 5/1995 |
| EP | 0 781 948 | 7/1997 |

* cited by examiner

*Primary Examiner*—Brian E. Glessner
*Assistant Examiner*—Carlos Lugo
(74) *Attorney, Agent, or Firm*—Oblon, Spivak, McClelland, Maier & Neustadt, P.C.

(57) ABSTRACT

A seal for a rotary compressor comprises a casing, at least one assembly having a rotating seal face ring which rotates as one with a sleeve intended to be mounted on a shaft of the compressor and of a stationary seal face ring mounted on the casing, the seal face rings being urged to press against one another via their rubbing face. The seal design further incorporates fluid circulation for heating leaks of compressible fluid conveyed by the compressor that occur between the seal face rings, this fluid circulation being formed in the casing and extending at least partially downstream of the seal face rings with respect to the direction of flow of the fluid stream.

9 Claims, 2 Drawing Sheets

SEAL FOR A COMPRESSOR AND CENTRIFUGAL COMPRESSOR EQUIPPED WITH SUCH A SEAL

BACKGROUND OF THE INVENTION

The present invention relates to a seal for a rotary compressor and to a compressor provided with such a seal.

DESCRIPTION OF RELATED ART

Rotary compressors are rotary machines intended to convey compressible fluids, and their purpose is to transfer mechanical energy to the fluid which passes through them with a view to increasing its pressure.

To this end they comprise a drive shaft which drives the rotation of a collection of wheels which mainly transmit to the fluid the mechanical energy supplied by the motor that drives the shaft.

With a view to containing the pressurized fluid within the body of the compressor, the ends of the shaft are provided with dry seals with sealing gas.

Such seals are conventionally provided with a casing, with a stationary seal face ring or gland washer mounted on the casing and with a rotating seal face ring which rotates as one seal sleeve mounted on the drive shaft of the compressor, these seal face rings being for example urged to press against one another by the action of a spring.

When the compressor is operating, the seals are subjected to high thermal loadings due, in particular, to the temperature of the fluid passing through the compressor, to the expansion of the fluid at the seal, to the shear of the film of fluid at the sealing interface between the respective friction faces of the rotating and stationary seal face rings, and to the ventilation losses brought about as the rotating seal face ring rotates through the fluid conveyed by the compressor.

It is known that these thermal loadings generate deformation at the rotating seal face ring and the stationary seal face ring as a result of differential expansion, and this carries the risk of leading to a loss of sealing or even to destruction of the hardware if the face rings come into contact.

What happens in particular is that leaks occur generally at the interface between the stationary seal face ring and the rotating seal face ring, and this causes a relatively significant local drop in the fluid temperature downstream, due to the expansion of this fluid.

Thus, for example, for assisted applications of recovering petroleum through the injection of natural gas, the equilibrium pressure of the gas injection compressor loop may be as high as 250 to 300 bar. The expansion brought about at the sealing interfaces of the compressor seal can locally drop the temperature to about −80° C.

Furthermore, since the compressible gases generally used in this type of compressor have water as a constituent, the drop in temperature is likely to give rise to the consequential formation of hydrates, for which the temperature of formation is of the order of −10° C.

As hydrates are solid compounds, their presence carries the risk of jamming the stationary seal face ring with respect to the rotating parts of the compressor, and this is likely to give rise to a loss of sealing when the machine is shut down, or even to prevent the latter from being started up again as long as the temperature remains lower than the hydrates formation temperature.

The object of the invention is to alleviate these disadvantages and to provide a seal and a centrifugal compressor which are capable of heating up the fluid downstream of the sealing interfaces of the seals while the machine is under pressurized shut down.

SUMMARY OF THE INVENTION

Thus, according to the invention, there is proposed a seal for a compressor, comprising a casing, at least one assembly consisting of a rotating seal face ring which rotates as one with a sleeve intended to be mounted on a shaft of the compressor and of a stationary seal face ring mounted on the casing, the seal face rings being urged to press against one another via their rubbing face.

According to one aspect of this seal, the latter further comprises means for circulating a fluid for heating the leaks of compressible fluid conveyed by the compressor and which occur between the seal face rings, the said circulating means being formed in the casing and extending at least partially downstream of the seal face rings when considering the direction of flow of the said stream of fluid.

The fluid flowing through the compressor seals is thus heated and this makes it possible to compensate for the cooling that is brought about during the expansion of this fluid downstream of the sealing interfaces.

According to another aspect of this seal, the said circulating means comprise a heating duct in communication with a supply source of heating fluid which operates independently of the means supplying the compressor with compressible fluid.

It is therefore possible to envisage heating the fluid within the seals even when the compressor is not running.

According to one particular embodiment, the casing is provided with a passage for the flow of the leaks of fluid and in which there is positioned a wall which, with the casing, delimits the said passage and which constitutes a surface for the exchange of heat energy.

As a preference, the face of the wall facing towards the heating duet is provided with ribs forming therein a heating coil.

For example, the heating fluid consists of oil.

According to another embodiment, the seal further comprises a heat exchanger arranged facing the rotating seal face ring.

According to the invention, there is also proposed a centrifugal compressor comprising a drive shaft driving the rotation of a collection of wheels able to transfer the mechanical energy supplied by the drive shaft to a compressible fluid and at least one shaft output seal.

According to one aspect of this compressor, the or each seal consists of a seal as defined hereinabove.

BRIEF DESCRIPTION OF THE DRAWINGS

Other objects, features and advantages of the invention will become apparent from the description which follows, given solely by way of nonlimiting example and made with reference to the appended drawings in which.

DETAILED DESCRIPTION OF THE INVENTION

Figure 1:
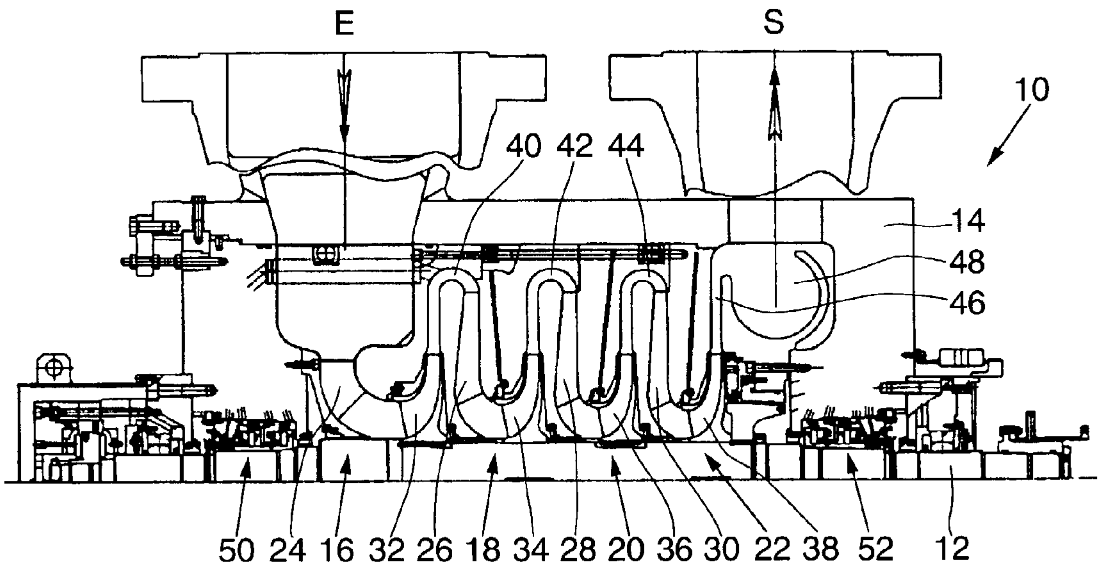
FIG. 1 is a schematic view in longitudinal section of a centrifugal compressor.

FIG. 1 depicts the overall structure of a centrifugal compressor, denoted by the general numerical reference 10.

It is intended for handling a compressible fluid and its purpose is to transfer mechanical energy to this fluid so as to increase its pressure.

In the example depicted, the compressor 10 consists of a multi-cell compressor, that is to say a multi-stage compressor. The compressor 10 actually has four compression stages.

It essentially comprises a drive shaft 12 driven in rotation by appropriate drive means and rotating in a casing 14.

This casing 14 is provided with an inlet E for the intake of compressible fluid, communicating with a supply source appropriate to the envisaged use, and with an outlet S for distributing the compressed fluid.

Between the inlet E and the outlet S the casing 14 is provided with the four compression stages 16, 18, 20 and 22.

Each stage 16, 18, 20 and 22 comprises, from the upstream end downstream, considering the direction of flow of the fluid through the compressor 10, an inlet guide 24, 26, 28 and 30 which guides the flow in the best direction for letting it into the compression stage, a bladed wheel 32, 34, 36, 38 actually transmitting the mechanical energy supplied by the drive shaft to the compressible fluid, some of the mechanical energy introduced being converted into pressure, some more being converted into speed, and a straightener or diffuser 40, 42, 44 and 46 reducing the speed of the fluid with a view to converting the dynamic pressure thereof into static pressure.

As can be seen in this FIG. 1, the last stage 22 of the compressor opens, at the downstream end, into a volute 48 of evolutive cross section constituting a final diffuser able to reduce the losses between the last compression stage and the outlet S.

Furthermore, the compressor is provided with seals, denoted by the general numerical references 50 and 52, with which the casing is equipped near the shaft outlets and which contain the pressurized fluid within the casing 14. The arrangements of these seals may be single (just one seal towards the outside), double (one seal towards the outside with sealing gas) or tandem (two seals in series towards the outside), depending on the application.

Figure 2:
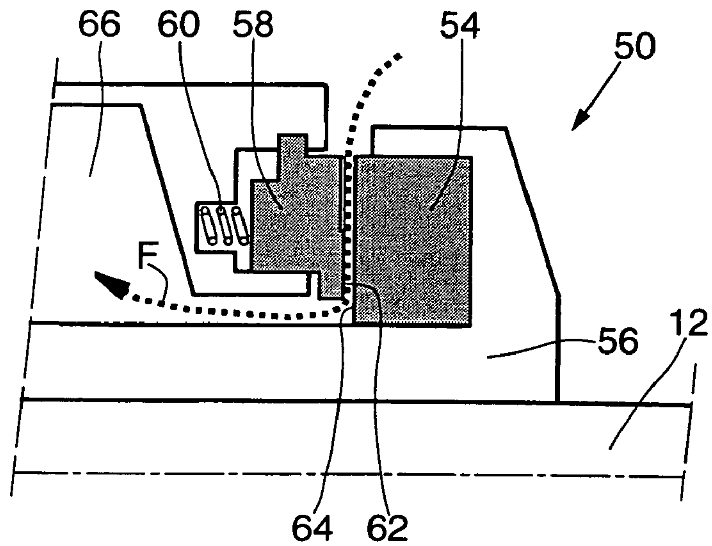
FIG. 2 is a schematic view illustrating the structure of a seal according to the prior art.

FIG. 2 depicts the overall structure of a seal according to the prior art. For example, this seal corresponds to the seal denoted by the general numerical reference 50. In this FIG. 2, elements identical to those of FIG. 1 bear the same reference numerals.

This seal comprises a rotary gland washer or rotating seal face ring 54 which rotates as one with a sleeve 56, itself fixed to the shaft 12 of the compressor, and a stationary seal face ring 58 fixed to the casing 14 and able to move axially with respect to the latter.

Elastically deformable means, consisting of a spring 60, urge the stationary seal face ring 58 to press against the rotating seal face ring 54 via their respective friction faces 62 and 64.

Addition sealing means (not depicted) provide sealing between the seal face rings 54 and 58 and the elements of the compressor on which they are mounted.

As indicated by the arrow F, in operation, a leak of compressible fluid occurs between the sealing interfaces 62 and 64 of the seal, that is to say between the friction faces of the rotating and stationary seal face rings.

The casing 14 of the compressor is therefore provided with a passage 66 for flow of the leaking gas, opening, for example, into a network of flares (not depicted).

As indicated previously, this type of seal has one major disadvantage relating to its thermal operation.

What actually happens, during rotation, is that recirculation of gas from the compressor thermally conditions the seal, that is to say removes heat energy, as is known per se. When the compressor is not running, these circulations no longer exist because there is no longer any natural pressure difference, and therefore play no part either in cooling the seal or in heating the leaks.

On leaving the sealing interface consisting of the friction faces 62 and 64 of the seal face rings, the fluid experiences expansion leading to a consequential drop in the temperature thereof such that hydrates can be created.

As is well known per se, these hydrates consist of solid compounds which carry the risk of jamming the stationary seal face ring and consequently of impeding the operation of the compressor.

A seal that makes it possible to alleviate this drawback will now be described with reference to FIG. 3.

In the exemplary embodiment depicted in that figure, this seal consists of a seal of the tandem type, that is to say that it has two seals 68 and 70 arranged in series.

Each sealing proper comprises a stationary seal face ring 71 mounted on a casing 72 of the compressor and a rotating seal face ring or rotary gland washer 73 secured to a sleeve 74, itself mounted on the drive shaft 76 of the compressor.

An elastic means consisting of a spring 78 urges the sealing interfaces consisting of the opposing friction faces 80 and 82 of the stationary and rotating seal face rings against one another.

As mentioned previously, leaks, denoted by the arrow F', give rise to a flow of compressible fluid between the sealing interfaces 80 and 82, which flow through a flow passage 84 produced for that purpose in the casing 72.

With a view to alleviating the disadvantages associated with the expansion of the compressible fluid downstream of the sealing interfaces 80 and 82, the casing 72 is provided with means of circulating a heating fluid, these means being arranged in the form of a heating duct 86 running at least partially downstream of the seal face rings 71 and 73.

This duct 86 is connected to a supply source of heating fluid, for example an oil whose heat capacity is suitable for allowing effective transfer of heat energy to the passage 84.

It will be noted that the temperature and the pressure of the fluid are chosen so as to ensure sufficient heating of the fluid in the flow passage 84 and to prevent the formation of hydrates.

Figure 3:
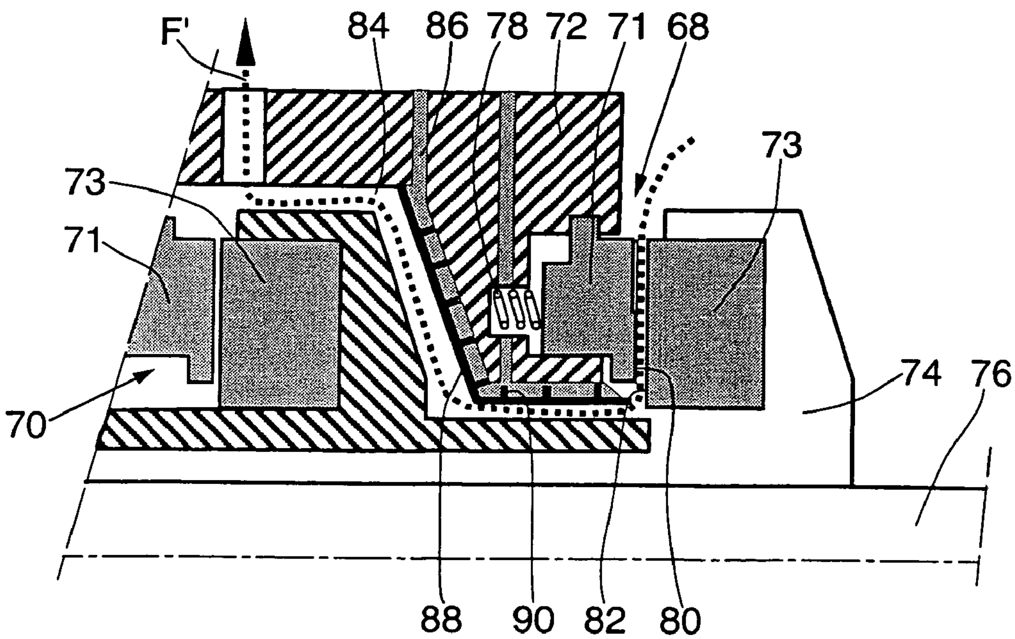
FIG. 3 is a diagram illustrating the structure of the seal according to the invention.

As can be seen in FIG. 3, with a view to affording effective transfer of heat energy to the fluid circulating through the passage 84, the heating duct 86 is formed in the passage 84 and is produced by placing in the latter a wall 88 which, with the casing 72, delimits the duct 86.

The wall 88 comprises, it its face facing towards the duct 86, ribs, such as 90, so as to form a heating coil in the duct 86.

As will be appreciated, the wall 88 is also chosen to form an area for heat exchange which is large enough to, in conjunction with the temperature and pressure levels of the heating fluid circulating in the duct 86, prevent the formation of hydrates in the fluid circulating through the leaks flow passage 84.

As will be appreciated, the hydrates formation temperature depends on the composition of the fluid being handled by the compressor. As the determining of the parameters that will allow the temperature of the fluid to be raised to a level higher than this hydrate formation temperature is within the competence of the person skilled in the art, it will therefore not be described in detail hereinafter.

It will also be noted that the wall 88 is made of a material able to withstand relatively high pressures that there may be in these seals if the seal becomes damaged in service, so as to avoid letting flammable process gas out into the atmosphere.

Finally, as far as the heating fluid supply source is concerned, this preferably consists of a supply source that operates independently of the remainder of the compressor and, in particular, of the compressible fluid supply source. The independence of this supply source is also such as to allow it great availability, which is important for the reliability of this seal.

It is thus possible to heat up the fluid circulating through the leak flow passage 84, even when the compressor is not running.

This then avoids any risk of the stationary seal face ring becoming immobilized with respect to the rotating parts of the compressor, even when the latter is not running.

This then gets around any need to empty or decompress the installation in which the compressor is incorporated.

It will finally be noted that the invention is not restricted to the embodiment envisaged.

This device also plays a part in cooling the dry seal when it is running in rotation. It is actually also possible, as an alternative, to supplement the compressor with an additional heat exchanger which heats up the fluid in the seal or seals, for example placed facing the rotating seal face ring.

What is claimed is:

1. A seal for a compressor configured to compress a working fluid, said seal comprising:
- a casing;
- at least one assembly comprising a rotating seal face ring configured to rotate as one with a sleeve mounted on a shaft of the compressor and a stationary seal face ring mounted on the casing; and
- circulating means for circulating a heating fluid for heating working fluid leaks that occur between the faces of the stationary and rotating seal face rings, said circulating means being operable when the compressor is not running, wherein a face of the stationary seal face ring is configured to be urged to press against a face of the rotating seal face ring, and said circulating means is formed in a low pressure region in the casing and extending at least partially downstream of the seal face rings with respect to a flow direction of said working fluid leaks.

2. The seal according to claim 1, wherein said circulating means comprise a heating duct in communication with a supply source of heating fluid which operates independently of working fluid supplying means for supplying the compressor with working fluid.

3. The seal according to claim 2, wherein the casing further comprises a flow passage for the working fluid leaks, said flow passage having a wall that, with the casing, is configured to delimit said flow passage so as to constitute a surface for an exchange of heat energy.

4. The seal according to claim 3, wherein a face of the wall facing towards the heating duct is provided with ribs forming therein a heating coil.

5. The seal according to any one of claims 1 to 4, wherein the heating fluid is an oil.

6. The seal according to claim 5, further comprising a heat exchanger facing the stationary seal face ring.

7. A centrifugal compressor comprising a drive shaft having a seal according to claim 6 and driving a rotation of a collection of wheels configured to transfer a mechanical energy supplied by the drive shaft to a compressible fluid and at least one shaft output seal.

8. A centrifugal compressor according to claim 7, further comprising a supply source for supplying the heating fluid to the circulating means, said supply source operating independently of the remainder of the compressor.

9. The seal according to claim 1, wherein the working fluid leaks are heated when the compressor is not operating.

* * * * *